(12) United States Patent
Riva

(10) Patent No.: US 11,852,249 B2
(45) Date of Patent: Dec. 26, 2023

(54) INLET SECTION FOR USE IN A HYDRAULIC DISTRIBUTOR

(71) Applicant: BUCHER HYDRAULICS S.p.A, Reggio (IT)

(72) Inventor: Massimo Riva, Modena (IT)

(73) Assignee: BUCHER HYDRAULICS S.p.A, Reggio (IT)

( * ) Notice: Subject to any disclaimer, the term of this patent is extended or adjusted under 35 U.S.C. 154(b) by 0 days.

(21) Appl. No.: 17/938,805

(22) Filed: Oct. 7, 2022

(65) Prior Publication Data

US 2023/0127835 A1    Apr. 27, 2023

(30) Foreign Application Priority Data

Oct. 21, 2021    (IT) .................... 102021000027122

(51) Int. Cl.
*F16K 11/07* (2006.01)
*F16K 31/122* (2006.01)

(52) U.S. Cl.
CPC .......... *F16K 11/07* (2013.01); *F16K 31/1221* (2013.01)

(58) Field of Classification Search
CPC .. F15B 13/0416; F16K 31/1221; F16K 11/07; F16K 11/0716; F16K 11/0708
See application file for complete search history.

(56) References Cited

U.S. PATENT DOCUMENTS

| | | | |
|---|---|---|---|
| 3,631,890 A | 1/1972 | McMillen | |
| 3,777,773 A | 12/1973 | Tolbert | |
| 2004/0020196 A1 | 2/2004 | Goto et al. | |
| 2009/0224192 A1* | 9/2009 | Oikawa | F16K 31/0613 251/129.15 |
| 2017/0167308 A1* | 6/2017 | Kopp | F02G 5/02 |
| 2018/0224014 A1* | 8/2018 | Colletti | F16K 31/0613 |
| 2021/0131582 A1* | 5/2021 | Ogasawara | F01L 1/3442 |
| 2023/0034880 A1* | 2/2023 | Backes | F16K 31/0613 |

FOREIGN PATENT DOCUMENTS

| | | |
|---|---|---|
| DE | 102004014113 A1 | 10/2005 |
| FR | 2745337 A1 | 8/1997 |
| WO | 2007116035 A1 | 10/2007 |

OTHER PUBLICATIONS

Search Report and Written Opinion as issued in connection with Italian Patent Application No. 102021000027122, dated May 5, 2022.

* cited by examiner

*Primary Examiner* — Kelsey E Cary
(74) *Attorney, Agent, or Firm* — MASCHOFF BRENNAN

(57) ABSTRACT

An inlet section for use in a hydraulic distributor including a valve body and a slider with a first area and a second area. The inlet section further including said slider being longitudinally slidable within the valve body between a first position in which it prevents passage of fluid from a high pressure line to a low pressure line, and a second position in which it enables passage of fluid. The inlet section further including a main spring active on the second area of the slider in a direction consistent with action of the second pressure and a control device of the slider. The control device of the slider includes a mechanical actuator member selectively active on the slider in a direction consistent with the action of the first pressure on the first area of the slider so as to force the slider in the second position.

9 Claims, 14 Drawing Sheets

INLET SECTION FOR USE IN A HYDRAULIC DISTRIBUTOR

CROSS-REFERENCE TO RELATED APPLICATION

This application claims priority to Italian Patent Application No. 102021000027122 filed on Oct. 21, 2021, the disclosure of which is incorporated herein by this reference in its entirety.

FIELD

The embodiments discussed herein are related to an inlet section for use in a hydraulic distributor.

BACKGROUND

The use of control valves is known which allow to control the flow provided to actuators regardless of their pressures. Such valves are commonly referred to as load-sensing direction control valves or load-sensing distributors.

As is known, a load-sensing system allows to keep the pressure drop substantially constant across the variable adjustment notches of a slider for directional valves. The delivery of flow to the uses can be considered independent of the load and proportional to the opening of the slider adjustment notches.

A particular type of load-sensing distributors are flow-sharing systems, which are widely used on movable machines which require simultaneous movements without loss of control in the various operating conditions. The flow-sharing (antisaturation) systems add some specific features to the traditional load-sensing systems which allow to solve the problem of the flow saturation and consequent loss of control and simultaneous movement.

When flow saturation occurs, if the users require more oil than is available to the pump, the flow-sharing systems are able to divide the available flow to the active functions proportionally to their request, avoiding sudden stops of movement and loss of control.

Specifically, open-centre load-sensing systems, in stand-by condition, i.e., when no flow is required by the users, discharge all the flow delivered by the pump. To carry out this function, they need a pressure compensator capable of discharging the pump flow in stand-by conditions and which is used to manage the LS pressure margin in operating conditions. If the total flow required by the users is lower than the pump feed rate, the pressure compensator works by discharging the excess flow which is not required by the functions actuated at a pressure value equal to the maximum pressure of the load to the uses (LS pressure) plus a Δp (pressure margin) related to the flow characteristic of the compensator and its settings.

In particular, the greater of the pressures of the uses is commonly referred to as the LS pressure. Various configurations related to of control valves are now provided.

In DE 10 2004 014 113, a low pressure margin in stand-by condition is obtained using a second discharging device of the piloted type, capable of managing the discharge of the pump flow at a nominal pressure of 3 bar. The pilot valve activates or deactivates the low pressure discharge system as a function of the LS pressure. With pressurized LS, the pilot closes and deactivates the discharge at low pressure so as to allow the intervention of the main compensator calibrated at a higher value. This solution is characterized by a very complex and articulated structure which requires a second compensator and a pilot valve for its control.

US 2004/0020196 proposes a piloted compensation mechanism capable of reducing the pressure margin in stand-by conditions. The mechanism consists of a main bypass slider, which manages the connection of the pressure line coming from the pump with the discharge, a pilot exchange valve and a decompression valve.

Such devices are arranged in different cavities. The exchange valve fixes the pressure acting on the spring chamber of the main bypass slider based on the balance between its spring and the pressure regulated by the decompression valve.

FR 2 745 337 describes an open-centre inlet section with discharge compensator and a two-position regulation device of the compensator spring. The device is capable of inhibiting the preload of the regulation spring to ensure, in the absence of an LS regulation signal, a free stroke without load of the compensator and consequently a free discharge of the pump flow in stand-by conditions.

WO 2007/116035 proposes a piloted-type differential area pressure compensator and its control device. The pressure compensator discharges the pump flow at two pressure levels based on how the control system manages the pressure acting on the differential areas of the compensator.

SUMMARY

An inlet section for use in a hydraulic distributor including a valve body and a slider, with a first area and a second area having substantially the same extension and being located at two opposite ends of said slider. The inlet section further including said slider being longitudinally slidable within the valve body between a first position in which it prevents passage of fluid from a high pressure line to a low pressure line, and a second position in which it enables passage of fluid, and said first area being subjected to action of a first pressure fed by the high pressure line and acting in a direction such as to push the slider towards the second position. The second area being subjected to a second pressure fed by a line for detecting a highest load pressure required by uses placed downstream of the distributor and said second pressure acting in the opposite direction to said first pressure and such as to push the slider towards the first position.

The inlet section further including a main spring active on the second area of the slider in a direction consistent with action of the second pressure and a control device of the slider. The control device of the slider includes a mechanical actuator member selectively active on the slider in a direction consistent with the action of the first pressure on the first area of the slider so as to force the slider in the second position. The mechanical actuator member including a third area and a fourth area being located at two opposite ends, said third area facing the first area of the slider and also subject to the first pressure. The control device further including a control spring active on the fourth area opposed to the main spring.

The inlet section further including a spring chamber being defined inside said valve body, in which the fourth area of the mechanical actuator member and an end of the control spring are located. The control device being configurable in a thrust condition, in which the third area acts on the first area of the slider together with the first pressure to force it into the second position thereof, and in a deactivating condition, in which the third area is distanced and retracted from the first area of the slider.

DESCRIPTION OF EMBODIMENTS

Figure 1:
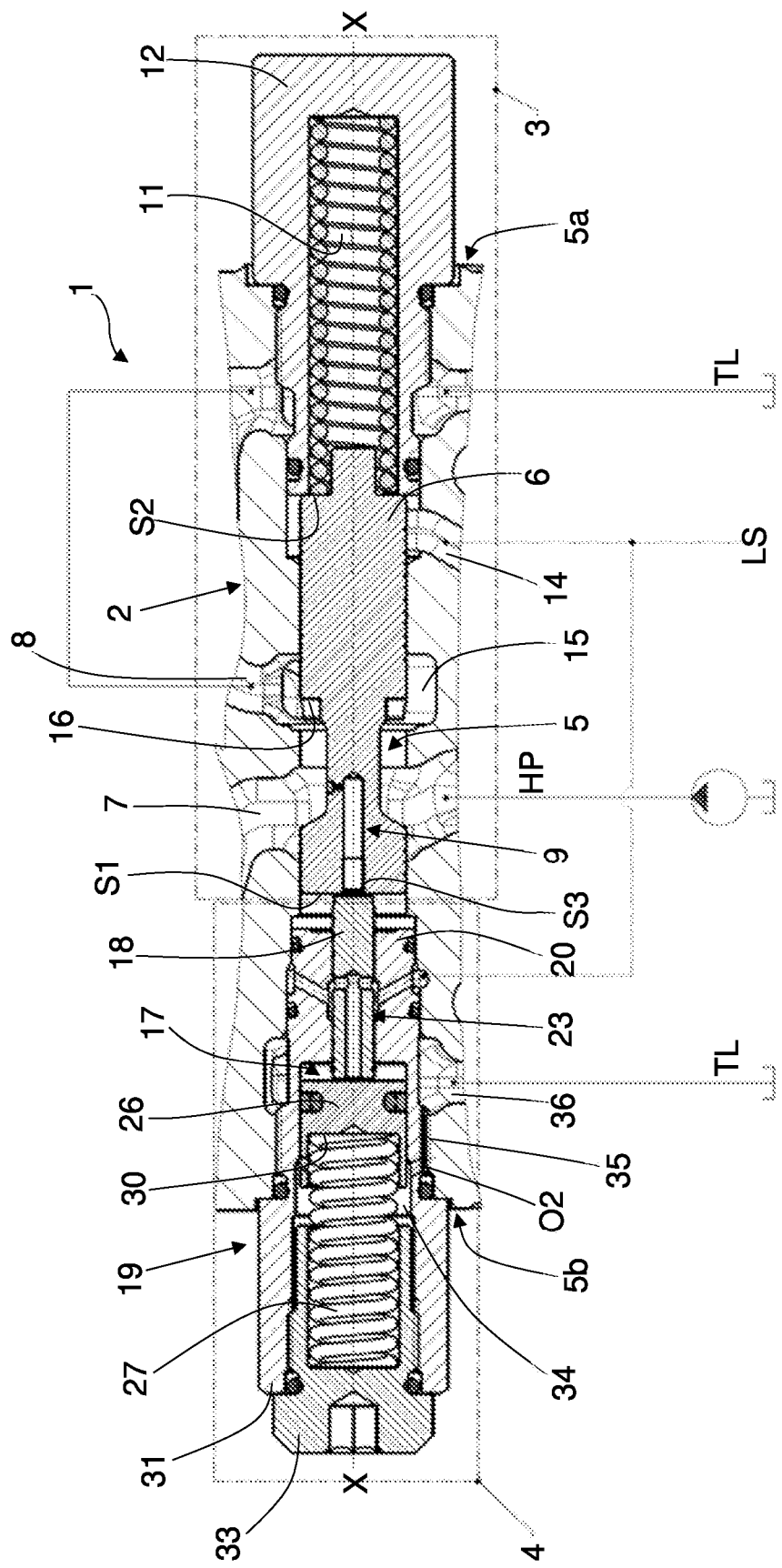
FIG. 1 shows a sectional view of an inlet section for use in a hydraulic distributor, according to the present disclosure, in a configuration in which the control device is active on the slider.

The background discusses use of control valves and fixed displacement pump configurations. A problem intrinsically connected to a fixed displacement pump configuration is the not insignificant energy loss and consequent thermal dissipation which occurs in system stand-by conditions. In this condition, the hydraulic power dissipation is equal to the flow fed by the pump multiplied by the pressure margin imposed by the characteristic of the discharge compensator. In stand-by conditions, a lower pressure margin implies lower power losses and better energy efficiency.

Furthermore, in certain operating conditions of the machine which do not require the maximum hydraulic performance of the system (for example movements at low speed), a controlled reduction of the pressure margin would ensure a further energy recovery. In a market increasingly focused on the electrification of machines for movable applications, the need to remedy unnecessary and uncontrolled power dissipations is felt.

Some solutions adopted by different manufacturers to meet the energy saving requirement in flow-sharing type load sensing distributors are briefly reviewed below.

The background discusses some solutions to problems with fixed displacement pump configuration. However, all of the solutions discussed in the background are characterized by a high complexity and are mainly based on structural changes of the main discharge compensator (with differential areas or double regulation position) and on the integration of second stages at low pressure.

In this context, the technical task underlying the present disclosure is to propose an inlet section for use in a hydraulic distributor which overcomes the drawbacks in the prior art as described above.

In particular, it is an object of the present disclosure to provide an inlet section for use in a hydraulic distributor, which allows a better energy balance of the load sensing system in an open-centre configuration in stand-by conditions, with respect to the known solutions.

Another object of the present disclosure is to propose an inlet section for use in a hydraulic distributor, which allows to reduce the thermal dissipation of the system with respect to the known solutions.

A further object of the present disclosure is to provide an inlet section for use in a hydraulic distributor capable of allowing at least a double level of control (fast and slow) of the machine, depending on the operating conditions required in carrying out the work, also implementing a controlled reduction of the pressure margin in a slow configuration.

Another object of the present disclosure is to propose an inlet section for use in a hydraulic distributor capable of allowing a continuous proportional control of the pressure margin.

Another object of the present disclosure is to propose an inlet section for use in a hydraulic distributor, which is structurally simpler and more compact than the known solutions.

The stated technical task and specified objects are substantially achieved by an inlet section for use in a hydraulic distributor, comprising:

a valve body;

a slider, with a first area and a second area having substantially the same extension and being located at two opposite ends of said slider, said slider being longitudinally slidable within the valve body between a first position in which it prevents the passage of fluid from a high pressure line to a low pressure line, and a second position in which it enables said passage of fluid, said first area being subjected to the action of a first pressure fed by the high pressure line and acting in a direction such as to push the slider towards the second position, said second area being subjected to a second pressure fed by a line for detecting the highest load pressure required by uses placed downstream of the distributor, said second pressure acting in the opposite direction to said first pressure and such as to push the slider towards the first position, a main spring active on the second area of the slider in a direction consistent with the action of the second pressure;

a control device of the position of the slider, comprising a mechanical actuator member selectively active on the first area of the slider in a direction consistent with the action of the first pressure so as to force the slider in the second position, said mechanical actuator member comprising a third area and a fourth area located at two opposite ends, said third area facing the first area of the slider and also subject to the first pressure, said control device further comprising a control spring active on the fourth area opposed to the main spring, a spring chamber being defined in said valve body, in which the fourth area of the mechanical actuator member and an end of the control spring are housed, said control device being configurable in a thrust condition, in which the third area acts on the first area of the slider together with the first pressure to force it into the second position thereof, and in a deactivating condition, in which the third area is distanced and retracted from the first area of the slider.

In accordance with an embodiment, the inlet section comprises a housing obtained in the valve body as a through hole having two open ends opposite each other. Preferably, the inlet section comprises a first cap and a second cap closing said two open ends. Preferably, the slider and the control device are arranged in the housing between the first cap and the second cap.

In accordance with an embodiment, the main spring is mounted so as to have a first abutment on the second area of the slider and a second abutment in a recess of the first closing cap.

In accordance with an embodiment, the control spring is mounted so as to have a first abutment on the fourth area of the mechanical actuator member and a second abutment in a recess of the second cap.

In accordance with an embodiment, the housing has a main extension along a longitudinal direction. Preferably, the slider and the mechanical actuator member are arranged in the housing aligned along the longitudinal direction.

In accordance with an embodiment, the main spring, the slider, the mechanical actuator member and the control spring act along the longitudinal direction.

In accordance with an embodiment, the mechanical actuator member comprises:

an actuator element longitudinally sliding inside the housing and selectively active on the first area of the slider to force it in the second position thereof, said actuator element having a fifth and a sixth area having substantially the same extension and being located at two opposite ends of said actuator element, said fifth area representing the third area of the mechanical actuator member, said sixth area being subjected to the action of the second pressure;

a piston having a seventh area in contact with the sixth area of the actuator element to move it towards the slider, said seventh area also being subject to the second pressure, and an eighth area representing the fourth area of the mechanical actuator member.

In accordance with an embodiment, the inlet section comprises an actuator body at least partially inserted in the housing and comprising:

a first portion shaped so as to have a through hole in which the actuator element is slidably inserted, thus defining an intermediate chamber between the slider, the internal walls of the valve body and the actuator body, in which said first area of the slider and said third area of the actuator element are located, said intermediate chamber being in fluid communication with the high pressure line;

a second portion shaped like a jacket and originating from the first portion away therefrom, said second portion wrapping the piston, said piston being slidably mounted therein.

In accordance with an embodiment, the second portion of the jacket has an open end in which it receives the second closing cap, thus defining said spring chamber between the mechanical actuator member, the internal walls of the second portion of the jacket and the second cap.

In accordance with an embodiment, the inlet section comprises a three-way, two-position device communicating with the spring chamber to selectively actuate the connection with the low pressure line or with the detection line of the highest load pressure required by the uses.

In accordance with an embodiment, the inlet section comprises a pressure reducer valve having a first inlet communicating with the high pressure line, a second inlet communicating with the detection line and an outlet communicating downstream with the spring chamber so as to feed a regulated pressure having a value comprised between that of the second pressure and that of the first pressure.

Further features and advantages of the present disclosure will become more apparent from the general and thus non-limiting description of a preferred, but not exclusive, embodiment of an inlet section for use in a hydraulic distributor, as illustrated in the accompanying drawings, in which:

With reference to the figures, number 1 indicates an inlet section for use in a hydraulic distributor FS. In particular, the inlet section 1 is applied in a hydraulic distributor FS of the load-sensing type and, more in detail, of the flow-sharing type.

A hydraulic feeding system, shown in FIGS. 7*a*, 7*b*, 8-13, typically consists of a fixed displacement pump P and the distributor FS. The pump P feeds the distributor FS along a high pressure line HP, which brings the fluid to uses A1, A2, B1, B2; a low pressure line TL connects the distributor FS to a discharge T.

The distributor FS consists of an inlet section 1, two control sections K1 and K2 responsible for controlling the machine actuators connected to the uses A1, A2, B1 and B2, and a closing section PH.

The distributor FS further comprises a line LS for detecting the highest load pressure required by the uses A1, A2, B1, B2.

Below in the text, the term "first pressure" will refer to the feed pressure of the pump P, transmitted to the distributor FS through the high pressure line HP; the term "second pressure" will instead refer to the pressure of the detection line LS.

The first and the second pressure are linked to each other by the pressure margin, which nominally corresponds to the difference between the two pressures.

By way of example, with regard to the operating pressure margin, when the compensator is in the working step and thus discharges part of the flow rate or the entire flow rate, this typically varies between 13 bar and 25 bar. As these are usually geared fixed displacement pumps or in extreme cases pistons, the maximum pressures are approximately between 230 bar and 300 bar.

The inlet section 1 comprises a valve body 2. There are housed within the valve body 2 a discharge compensator 3, which selectively connects the high pressure line HP to the low pressure line TL, and a control device 4 which actuates the pressure margin reduction function by mechanically acting on the dynamic balance of the compensator 3.

Preferably, a housing 5 is obtained in the valve body 2. The compensator 3 and the control device 4 are arranged inside the housing 5.

The compensator 3 comprises a slider 6 longitudinally slidable within the valve body 2 between a first position, in which it prevents the passage of fluid from the high pressure line HP to the low pressure line TL, and a second position, in which it enables the passage of the pressurized fluid coming from the high pressure line HP towards the low pressure line TL.

Preferably, the second position of the slider 6 is an extreme operating position, in which the passage of fluid at the maximum possible flow rate is allowed.

The first position instead does not allow the passage of fluid, therefore the fluid flow rate is zero.

In an intermediate position between the first and the second position, the passage of fluid from the high pressure line HP towards the low pressure line TL occurs with an intermediate flow rate between 0 and the maximum value.

Figure 2:
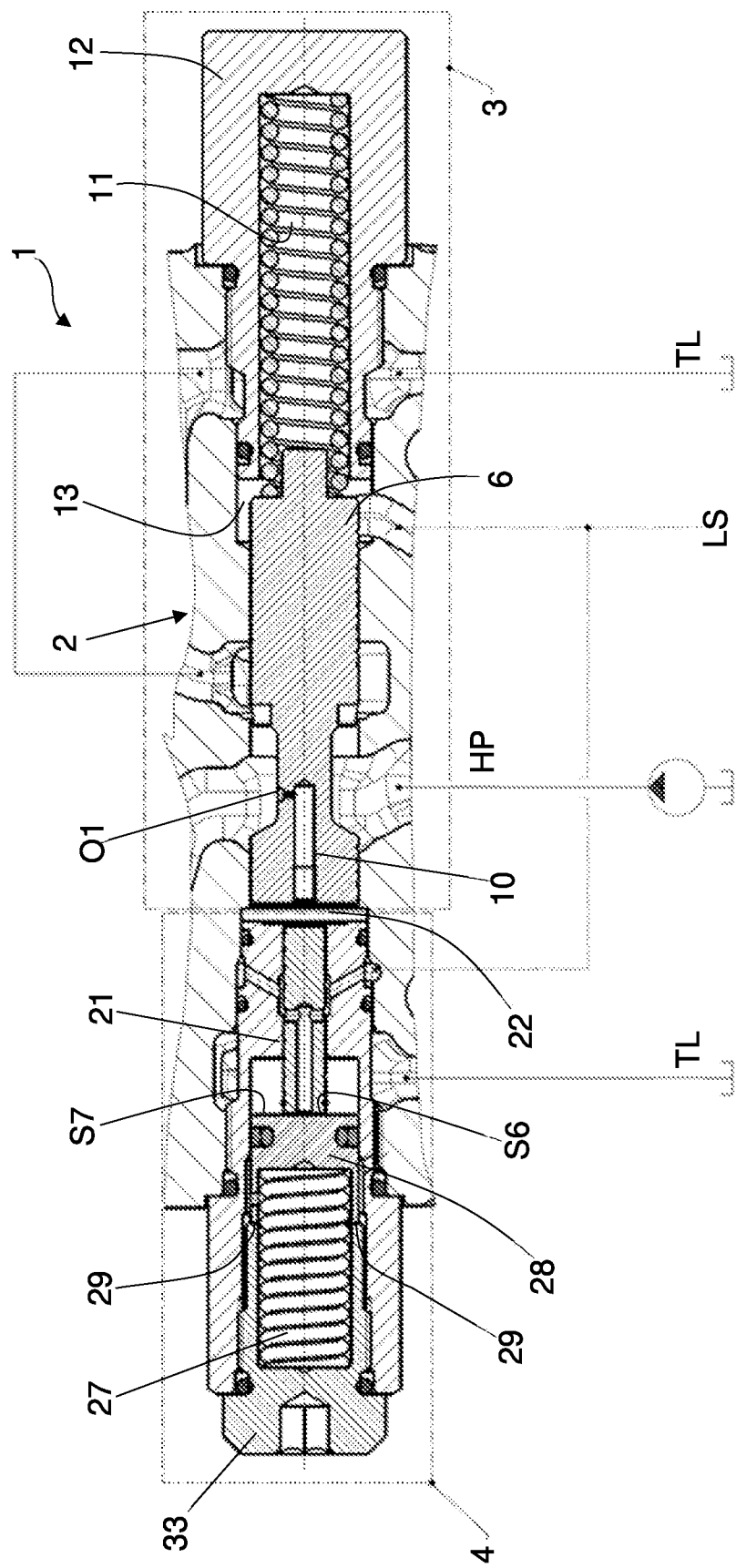
FIG. 2 shows a sectional view of the inlet section of FIG. 1, in a configuration in which the control device is deactivated.
Figure 3:
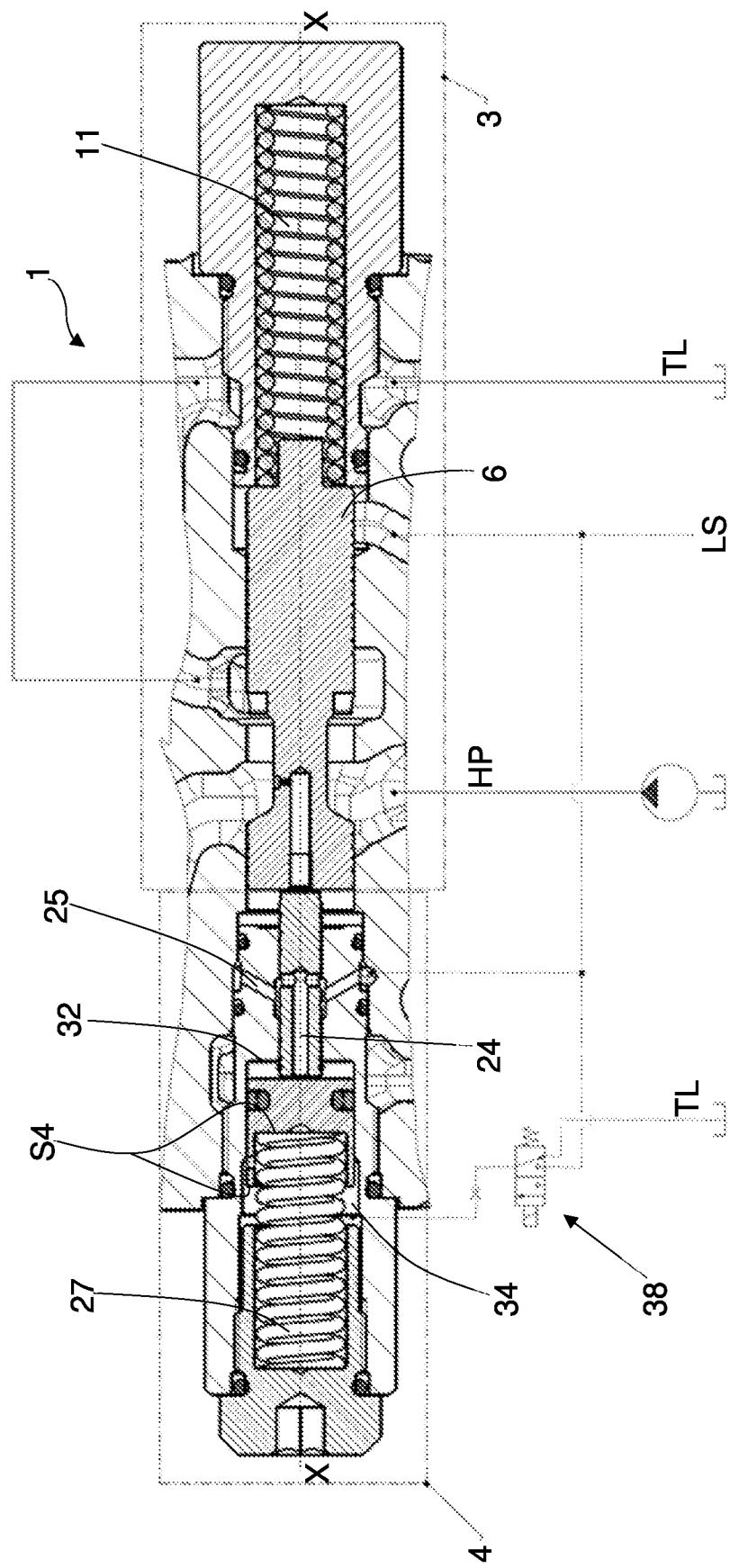
FIG. 3 shows a sectional view of an alternative embodiment (solenoid valve communicating with spring chamber) of the inlet section, in a configuration in which the control device is active on the slider.
Figure 4:
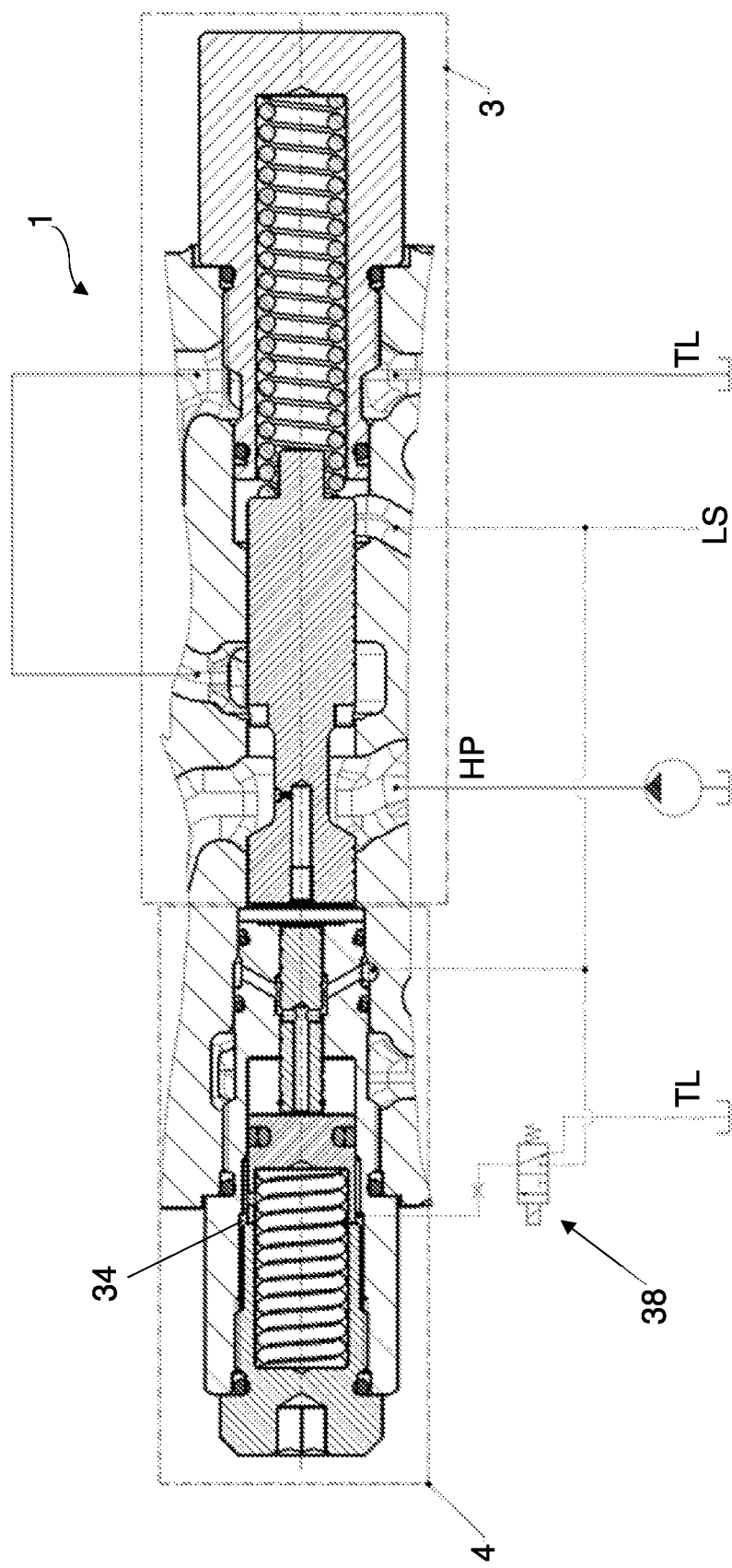
FIG. 4 shows a sectional view of the inlet section of FIG. 3, in a configuration in which the control device is deactivated.
Figure 5:
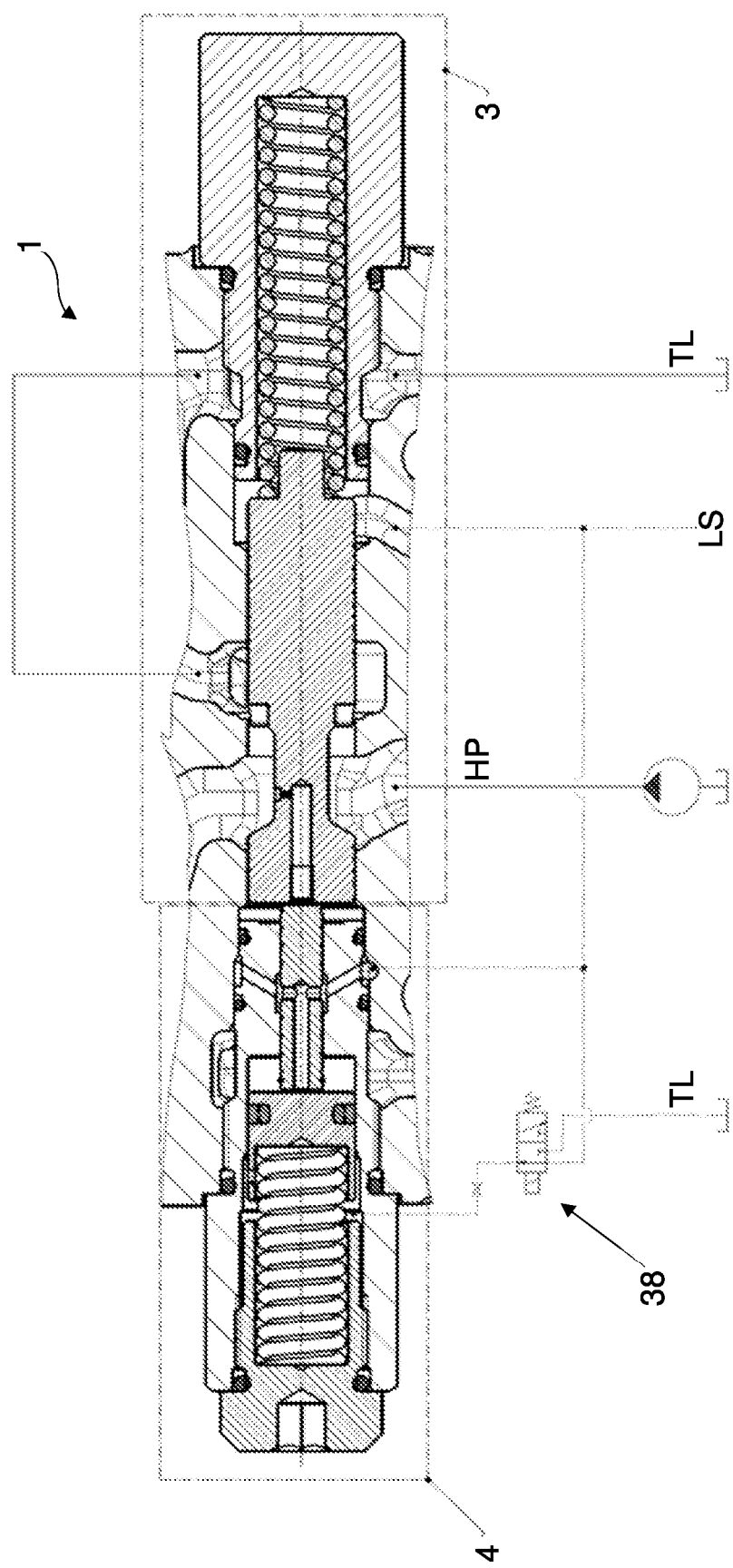
FIG. 5 shows a sectional view of the inlet section in the embodiment of FIG. 3, in a slow control configuration of the system.
Figure 6:
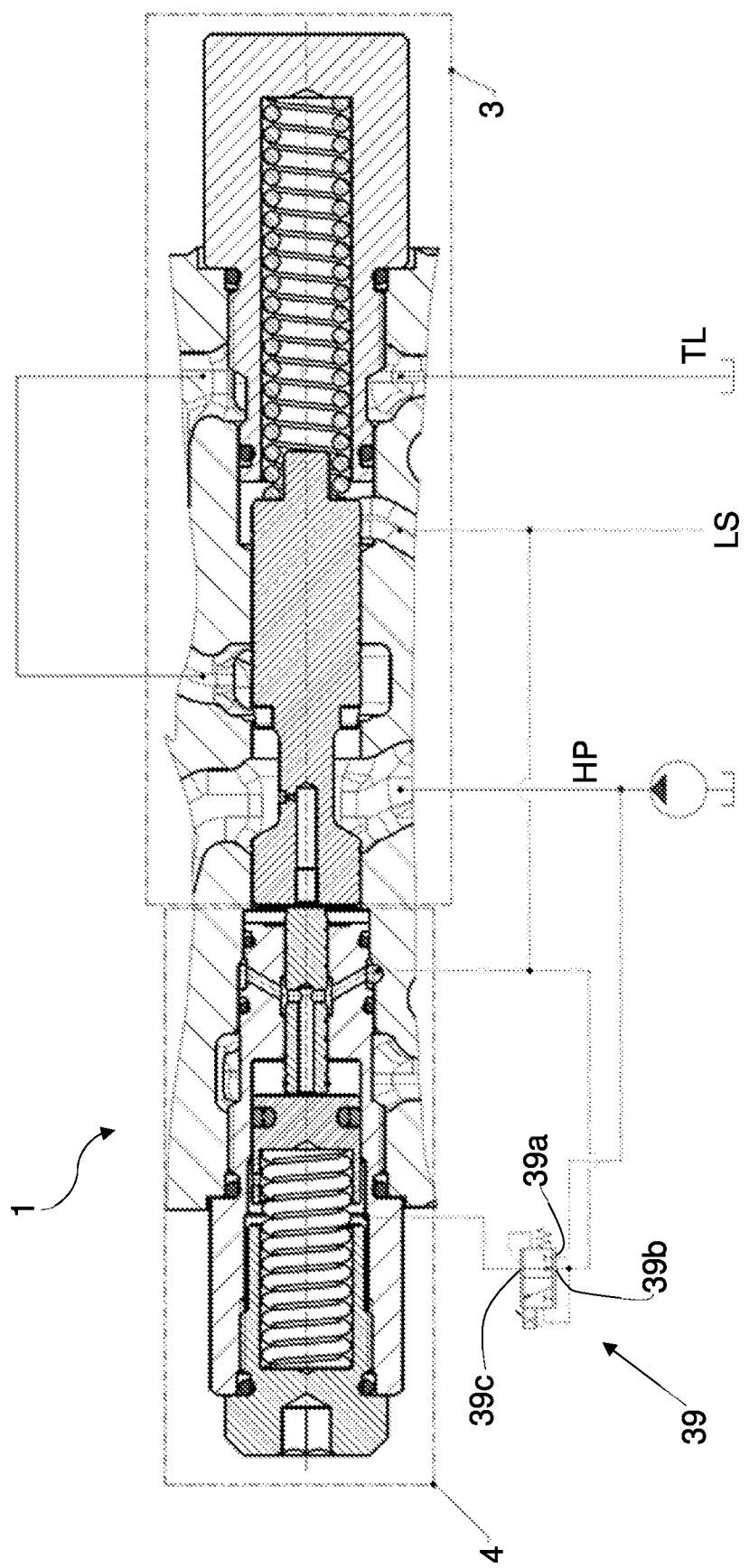
FIG. 6 shows a sectional view of a further embodiment (proportional pressure reducer communicating with spring chamber) of the inlet section.

FIG. 1 shows a condition in which the slider 6 is in the second position, FIG. 2 shows a condition in which the slider 6 is in the first position.

The slider 6 has a first area S1 and a second area S2 having substantially the same extension and being located at two opposite ends of the slider 6.

The first area S1 is subjected to the action of the first pressure (feed pressure of the high pressure line HP), the second area S2 to the action of the second pressure (pressure of the line LS).

In the embodiment described and shown herein, a first conduit 7 is made in the valve body 2 communicating with the high pressure line HP and a second conduit 8 communicating upstream with the first conduit 7 (and thus indirectly with the high pressure line HP) and downstream with the low pressure line TL.

The communication between the first conduit 7 and the second conduit 8 is selective. The selection occurs by means of the slider 6.

The first position of the slider 6 is such that the communication between the first conduit 7 and the second conduit 8 is prevented. The second position of the slider 6 is such that the communication between the first conduit 7 and the second conduit 8 is enabled.

In the embodiment described and shown herein, a fluid passage 9 is obtained in the body of the slider 6 so as to put the first area S1 in communication with the first conduit 7. In particular, the first conduit 7 is interposed between the first and the second area S1, S2.

Preferably, the fluid passage 9 comprises an internal channel 10 originating at the first area S1 with longitudinal extension and a transverse choke O1 which puts the channel 10 in communication with the first conduit 7.

The compensator 3 comprises a main spring 11 active on the slider 6 in a direction consistent with the action of the second pressure on the second area S2. In particular, the spring 11 acts directly on the second area S2.

Preferably, a first closing cap 12 is arranged to close an open end of the housing 5. The main spring 11 is at least partially housed in an internal recess of the first cap 12. That is, the main spring 11 is mounted so as to have a first abutment on the second area S2 of the slider 6 and a second abutment in a recess of the first cap 12.

Thereby, a front chamber 13 is defined between the first cap 12, the internal walls of the valve body 2 and the slider 6. The second active area S2 is located in the front chamber 13 and slides therein.

The front chamber 13 is subjected to the second pressure by a third conduit 14 obtained in the valve body 2. The third conduit 14 communicates with the detection line LS.

In the embodiment described and shown herein, a discharge chamber 15 is defined in the valve body 2. The discharge chamber 15 communicates upstream with the high pressure line HP by means of the first conduit 7 and downstream with the low pressure line TL by means of the second conduit 8.

Preferably, the slider 6 comprises an intermediate shutter section 16 between the first and the second area S1, S2. The shutter section 16 slides inside the discharge chamber 15. When the slider 6 is in the first position, the shutter section 16 blocks the passage of fluid between the first conduit 7 and the second conduit 8.

When the slider 6 is in the first position, it can be defined that the compensator 3 is in a closed condition since communication between the high pressure line HP and the low pressure line TL is not allowed. In this closed condition, which corresponds to one of the standard operating conditions of the hydraulic distributor FS, in particular to the flow saturation condition, the high pressure line HP communicates with the uses A1, A2, B1, B2 downstream. The compensator 3 is kept closed by the force exerted by the second pressure acting on the second area S2 and by the action of the main spring 11.

When the slider 6 is in the second position, the shutter section 16 enables the communication between the first conduit 7 and the second conduit 8, i.e., allows the passage of fluid from the first conduit 7 to the second conduit 8.

In the embodiment described and shown herein, the second position is such that the shutter section 16 of the slider 6 offers the least encumbrance to the communication gap between the first conduit 7 and the second conduit 8, allowing the passage of the maximum fluid flow.

When the slider 6 is in the second position, it can be defined that the compensator 3 is in an open condition: the system is in a stand-by condition for which a flow to the uses A1, A2, B1, B2 is not required, therefore the flow of the pump is discharged (i.e., the high pressure line HP communicates with the low pressure line TL, thanks to the open compensator 3).

The second position can be reached both in non-operating conditions (functions not implemented, i.e., the flow is not required to the uses A1, A2, B1, B2) and in operating (or standard operating) conditions, when not in flow saturation conditions.

The compensator 3 is controlled in opening (activation of the total or excess discharge of the pump flow) by the force exerted by the first pressure acting on the first area S1 and possibly by the action of the control device 4.

In a standard operating condition of the hydraulic distributor FS, with the exception of the flow saturation condition, the slider 6 is in an intermediate position between the first and the second position, in which it discharges the excess flow, not required by the uses A1, A2, B1, B2.

The balance of the forces at stake for the balance of the slider 6, also comprising the portion of hydraulic flow forces, determines the operating pressure margin of the load-sensing system.

When the slider 6 is in the second position, the main spring 11 is more compressed with respect to when the slider 6 is in the first position.

The second area S2 of the slider 6 is located at a lower distance from the first cap 12 when the slider 6 is in the second position rather than the first position.

The control device 4 comprises mechanical actuator member 17 selectively active on the slider 6 to force it in the second position. In particular, the mechanical actuator member 17 is selectively active on the slider 6 to exert an antagonistic force on the compensator 3, reducing the pressure necessary to maintain the discharge position of the pump flow (second position). That is, the control device 4 selectively acts on the compensator 3 to force it in its open condition, described above.

Preferably, the mechanical actuator member 17 comprises a third area S3 and a fourth area S4. The third area S3 of the mechanical actuator member 17 faces the first area S1 of the slider 6 and acts thereon. Therefore, the third area S3 of the mechanical actuator member 17 is subject to the first pressure.

The fourth area S4 is located in an environment communicating with the low pressure line TL. That is, the fourth area S4 is discharged so as to inhibit the pressure effects thereon.

In particular, the control device 4 is configurable in a thrust condition, shown in FIG. 1, in which the third area S3 of the mechanical actuator member 17 acts on the slider 6 together with the first pressure to force it in its second position. The thrust condition of the control device 4 corresponds to the aforementioned stand-by condition of the system, whereby the flow of the pump is discharged.

The control device 4 is also configurable in a deactivating condition, shown in FIG. 2, in which the third area S3 of the mechanical actuator member 17 is distanced and retracted from the slider 6. In this condition, the slider 6 is subjected to the pressure forces active on its two areas S1, S2 and to the action of the main spring 11, therefore it is distanced from the second position.

In the flow saturation condition, the slider 6 is brought into its first position.

In standard operating conditions with the exception of the flow saturation condition, the slider 6 is in the aforesaid intermediate position, in which it discharges the flow not required by the uses A1, A2, B1, B2.

The deactivation condition of the control device 4 therefore corresponds to one of the standard operating conditions of the system.

In the embodiment described and shown herein, the mechanical actuator member 17 comprises an actuator element 18 longitudinally slidable towards/away from the slider 6. The actuator element 18 acts on the first area S1 of the slider 6.

The actuator element 18 has a fifth area and a sixth area S6. In particular, the fifth area of the actuator element 18 corresponds to the third area S3 of the mechanical actuator member 17.

For this reason, reference S3 indicates in the following both the third area and the fifth area.

Preferably, the fifth area S3 and the sixth area S6 substantially have the same extension and are located at two opposite ends of the actuator element 18.

The action exerted by the pressures on the actuator element 18 is consistent with the opening of the compensator 3 considering the sixth area S6 and in the opposite direction considering the fifth area S3.

In particular, the fifth area S3 of the actuator element 18 faces the first area S1 of the slider 6 to selectively act thereon. The fifth area S3 is thus also subject to the first pressure.

The sixth area S6 of the actuator element 18 is subject to the second pressure.

In the embodiment described and shown herein, the control device 4 comprises an actuator body 19 at least partially inserted in the valve body 2. The actuator body 19 comprises a first portion 20 shaped so as to have a through hole 21, in which the actuator element 18 is slidably inserted.

Thereby, an intermediate chamber 22 is defined between the slider 6, the internal walls of the valve body 2 and the actuator body 19.

The first area S1 of the slider 6 and the fifth area S3 of the actuator element 18 are located in the intermediate chamber 22. Therefore, the fifth area S3 is subject to the first pressure fed to the intermediate chamber 22 by means of the passage of fluid 9 obtained in the slider 6.

Preferably, the second pressure is transmitted to the sixth area S6 by means of a further fluid passage 23 obtained through a plurality of channels 24, 25 made in the actuator body 19 and in the actuator element 18.

In the embodiment described and shown herein, the mechanical actuator member 17 comprises a piston 26 active on the actuator element 18 to move it towards the slider 6. The piston 26 contacts the actuator element 18 at its sixth area S6.

In particular, the piston 26 comprises a seventh area S7 in contact with the sixth area S6 of the actuator element 18 and therefore also subject to the second pressure. The piston 26 comprises an eighth area corresponding to the fourth area S4 of the mechanical actuator member 17.

The control device 4 comprises a control spring 27 active on the fourth area S4 of the mechanical actuator member 17. The control spring 27 is mounted so as to extend in a direction consistent with the opening movement of the compensator 3 (i.e., when the slider 6 passes from the first to the second position) and to compress in a direction consistent with the closing movement of the compensator 3 (i.e., when the slider 6 passes from the second to the first position). That is, the control spring 27 acts on the mechanical actuator member 17 to push the slider 6 into its second position.

The control spring 27 works opposed to the main spring 11.

In the embodiment described and illustrated herein, the piston 26 has a cylinder cup shape. That is, the piston 26 comprises a thrust portion 28 facing the actuator element 18 and a hollow shell portion 29 therein, originating from the thrust portion 28 away therefrom. The shell portion 29 comprises an internal abutment surface 30 for an end of the control spring 27. The eighth area S4 is obtained from the sum of the extreme circular surface of the shell 29 and the abutment surface 30.

Preferably, the seventh area S7 and the eighth area S4 substantially have the same extension and are located in two opposite ends of the piston 26.

The actuator element 18 acts as a mechanical actuator in the control device 4, transmitting the action of the control device 4 to the compensator 3 and consequently altering its dynamic balance. The piston 26 also ensures the guide and the work abutments of the control spring 27.

The size of the control piston 26 determines the efficiency of resetting the system in the transition from the function of reducing the pressure margin (compensator 3 open, with slider 6 in the second position) to that of flow saturation operation (compensator 3 closed, with slider 6 in the first position) or to a nominal operating condition (compensator 3 partially open, with slider 6 in an intermediate position between the first and the second position), in which the control device 4 is inhibited.

In the preferred but not exclusive embodiment, the active areas S6, S4, S1 and S2 are the same.

The action of the control spring 27 is in contrast to the action of the main spring 11 and from their combination, if activated by the control device 4, an equivalent spring is in fact generated which determines the characteristic low pressure discharge object of embodiments provided in the disclosure. The action of the spring 27, together with the action of the pressures acting on the seventh and on the eighth area S7, S4, is transmitted to the actuator element 18 which amplifies the effects and together with the pressures acting on the fifth and sixth active area S3, S6 transmits the effects to the compensator 3. An appropriate management of the pressures acting on the control device 4 and its nominal characteristic allows different control strategies to be implemented, some of which are depicted in the figures.

In the embodiment described above, the mechanical actuator member 17 comprises the actuator element 18 and the piston 26, which are independent of each other, but collaborative to act on the compensator 3.

In an alternative embodiment (not shown), the mechanical actuator member 17 comprises a monolithic differential piston. This replacement does not involve changes to the functional efficacy of the embodiments provided in the disclosure.

In the embodiment described and shown herein, the actuator body 19 comprises a second portion 31 shaped like a jacket originating from the first portion 20 away therefrom.

The piston 26 is wrapped by the second portion 31 of the jacket and can slide within the latter. In particular, the first portion 20 comprises an abutment 32 which determines a limit of the stroke of the piston 26 towards the compensator 3. The passage of fluid 23 originates from the abutment 32, with extension in the opposite direction.

In the embodiment described and shown herein, the housing 5 is obtained in the valve body 2 as a through hole and having a first and a second open end 5a, 5b opposite each other. The inlet section 1 comprises the first cap 12 already described above and a second cap 33 closing the first and second open ends 5a, 5b, respectively. Thereby, the compensator 3 and the control device 4 are in the same environment and closed between the first cap 12 and the second cap 33.

The main spring 11 and the first cap 12 are arranged at the first open end 5a, as described above.

Preferably, the actuator body 19 is partially inserted in the housing 5 so that at least a part of its second portion 31 of the jacket protrudes from the second open end 5b. The second portion 31 of the jacket has a corresponding open end which receives the second cap 33.

The second closing cap 33 forms the second preload abutment of the control spring 27. Preferably, the control spring 27 is partially housed in a recess of the second closing cap 33.

Thereby, a spring chamber 34 is defined between the piston 26, the internal walls of the jacket portion 31 and the second cap 34.

The spring chamber 34 is connected to discharge (i.e., to the low pressure line TL) by means of a choke O2 obtained in the jacket portion 31, so as to inhibit the pressure effects on the second active area S4. The choke O2 is connected to the low pressure line TL by means of a passage 35 obtained by mechanical machining on the actuator body 19 which opens into a fourth conduit 36, communicating with the low pressure line TL. The choke O2 is used for controlling the dynamics of the piston 26 and consequently of the entire system object of embodiments provided in the disclosure.

The control spring 27 works opposite to the main spring 11 and its preload and rigidity determine the second reference pressure value LS for the deactivation of the control device 4 in low pressure of the discharge compensator 3.

In the presence of an appropriate second pressure value acting on the active areas S6, S7 and the corresponding first pressure acting on the fifth area S3 of the actuator element 18, the control device 4 is deactivated (standard operating condition of the distributor FS). Deactivation of the control device 4 herein means that the mechanical actuator member 17 of the control device 4 is distanced (thus retracted) from the slider 6 and does not act thereon.

In the detail of the preferred embodiment, in the deactivating condition of the control device 4, the piston 26 and the actuator element 18 will tend to compress the control spring 27. In this configuration, the actuator element 18 is completely decoupled from the slider 6 which can operate freely without being subject to the dynamic and functional interference of the control device 4.

The deactivation of the control device 4 means that the actuator element 18 is distanced and retracted with respect to the slider 6. Thereby, the compensator 3 is only subjected to the effect of the pressures in play and the main spring 11.

In stand-by conditions, the second pressure is discharged by means of a compensated valve 37 (visible in FIGS. 6a, 6b, 7-11, in the outlet block PH) and the pump flow is discharged by the compensator 3.

In a traditional configuration, the discharge pressure would be determined by the features of the main spring 11. In the configuration object of embodiments provided in the disclosure, however, the compensator 3 is subject to the additional action of the control device 4 through the actuator element 18 since, the second pressure LS being zero, the control spring 27 can mechanically transmit part of its dynamic characteristic to the slider 6 reducing, to maintain the overall dynamic balance, the pressure force HP quota necessary to ensure the discharge of the pump flow. All this translates into an automatic reduction of the pressure margin to non-operating functions.

Preferably, when the control device 4 is deactivated, the second cap 33 acts as an abutment and stroke end of the mechanical actuator member 17, in particular of the fourth area S4.

In the embodiment shown in the figures, in particular 2 and 4, the second cap 33 acts as an abutment and stroke end for the piston 26.

Preferably, the housing 5 has a main extension according to a longitudinal direction X-X. The compensator 3 and the control device 4 are arranged in sequence inside the housing 5. Preferably, the compensator 3 and the control device 4 are aligned along the longitudinal direction X-X. Preferably, the slider 6 and the mechanical actuator member 17 are arranged in the housing 5 aligned along the longitudinal direction X-X.

In particular, the slider 6, the piston 26 and the actuator element 18 slide inside the housing 5 according to the longitudinal direction X-X. In other words, the slider 6, the piston 26 and the actuator element 18 are aligned.

Preferably, the slider 6, the main spring 11, the actuator element 18, the piston 26 and the control spring 27 act along the longitudinal direction X-X.

Thereby, it is possible to implement embodiments of the present disclosure in a distributor FS already in use, without having to perform invasive operations on the structure. In fact, the head (i.e., the valve body 2) and the compensator 3 remain those already in use and the control device 4 described above is implemented in the same hole already present for the compensator.

Figure 7A:
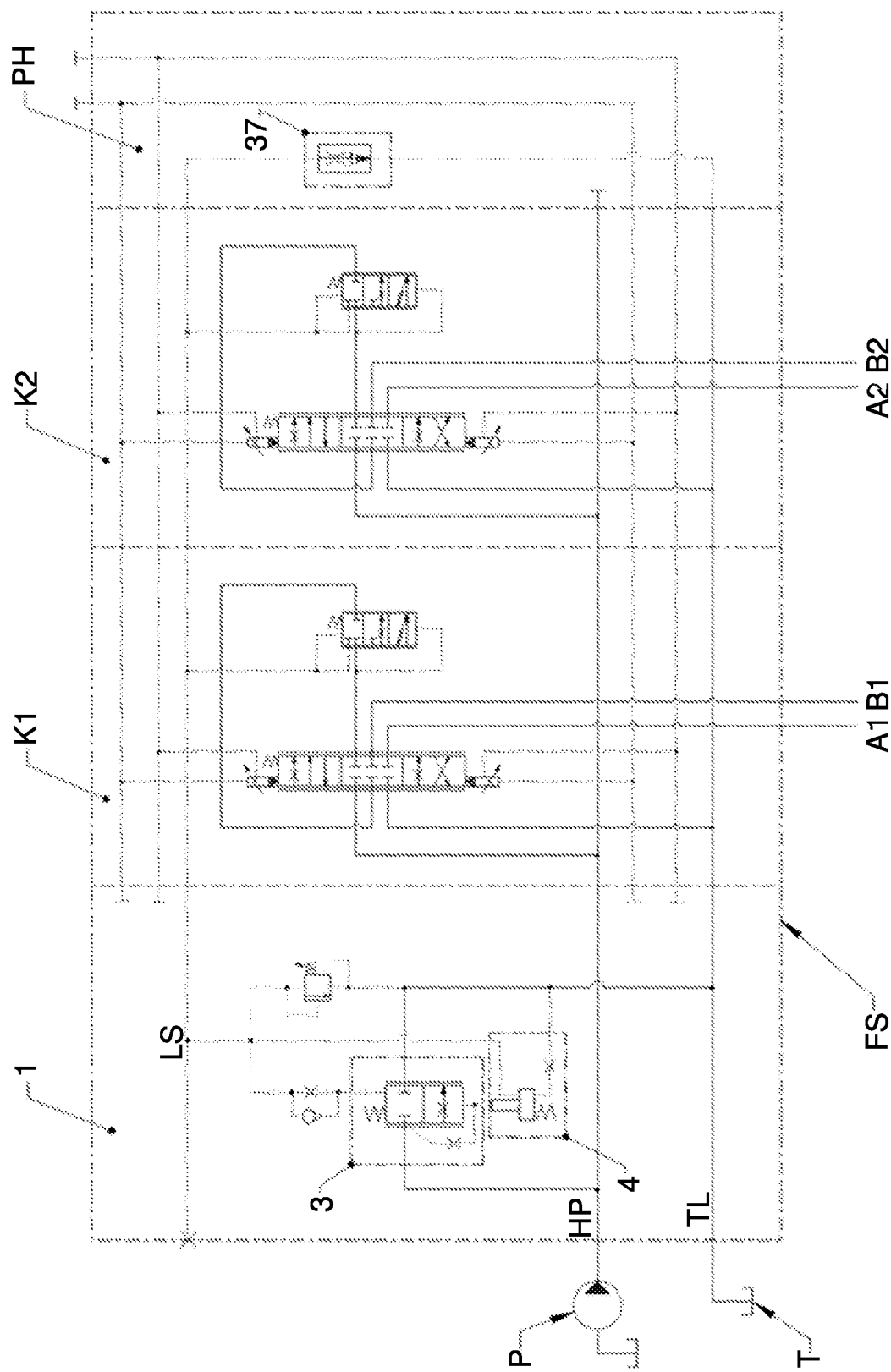
FIG. 7a shows a hydraulic diagram of a hydraulic distributor comprising the inlet section in the embodiment of FIG. 1, in a version with an internal discharge connection of the spring chamber.
Figure 7B:
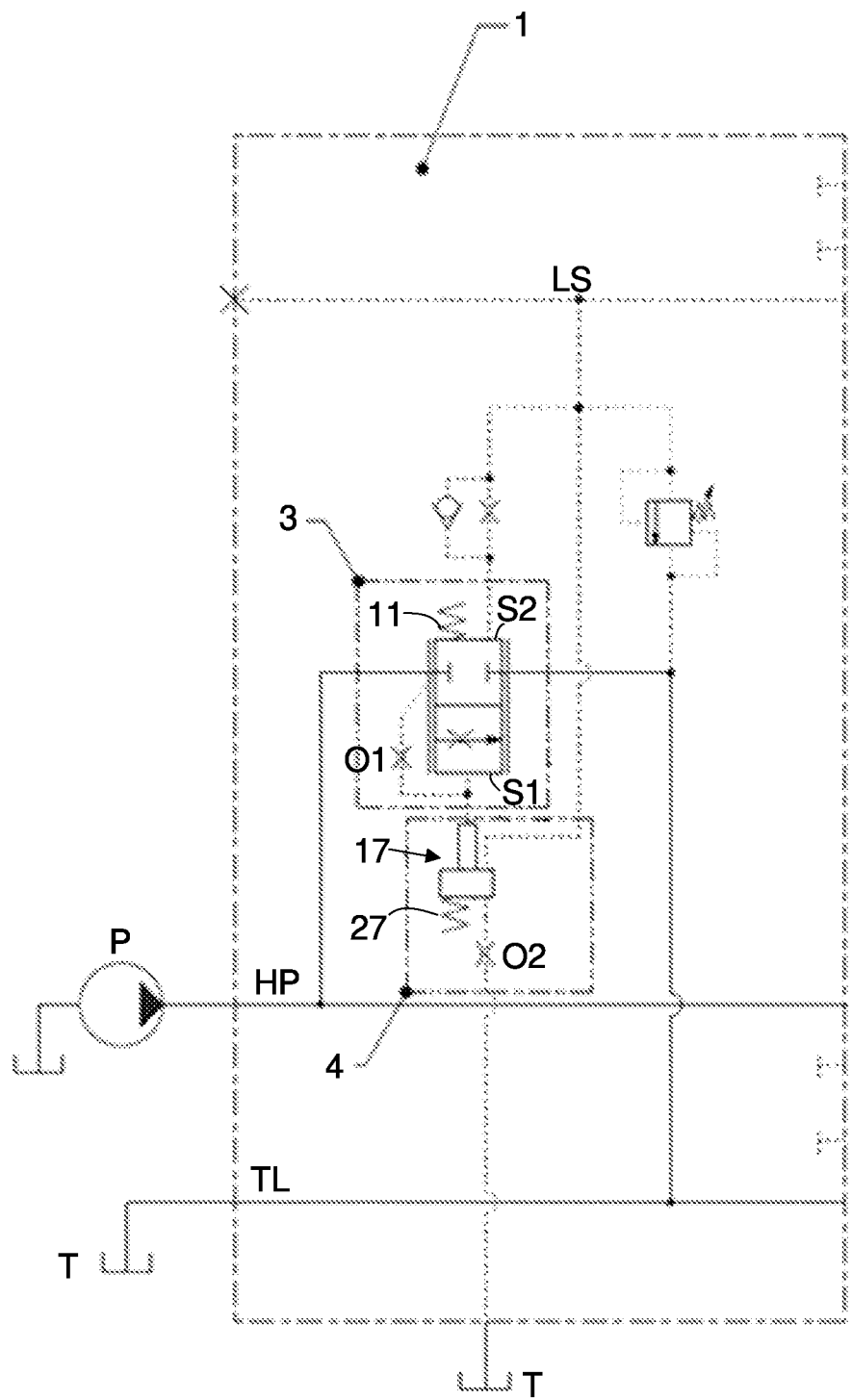
FIG. 7b shows a hydraulic diagram of the inlet section of FIG. 7a only, in a version with an external discharge connection.

With reference to the use of the inlet section 1 in a hydraulic distributor FS, FIG. 7a shows the version with an internal discharge connection of the spring chamber 34, in FIG. 7b the one with an external discharge connection.

The configurations described fully meet the energy saving and thermal balance objectives of the system in stand-by conditions.

The variants shown in FIGS. 8-12 represent different configurations capable of managing all the potential objectives of embodiments provided in the disclosure, including those mentioned above and also the objective of ensuring at least a double level of slow and fast control of the machine with a controlled reduction of the operating pressure margin.

Figure 8:
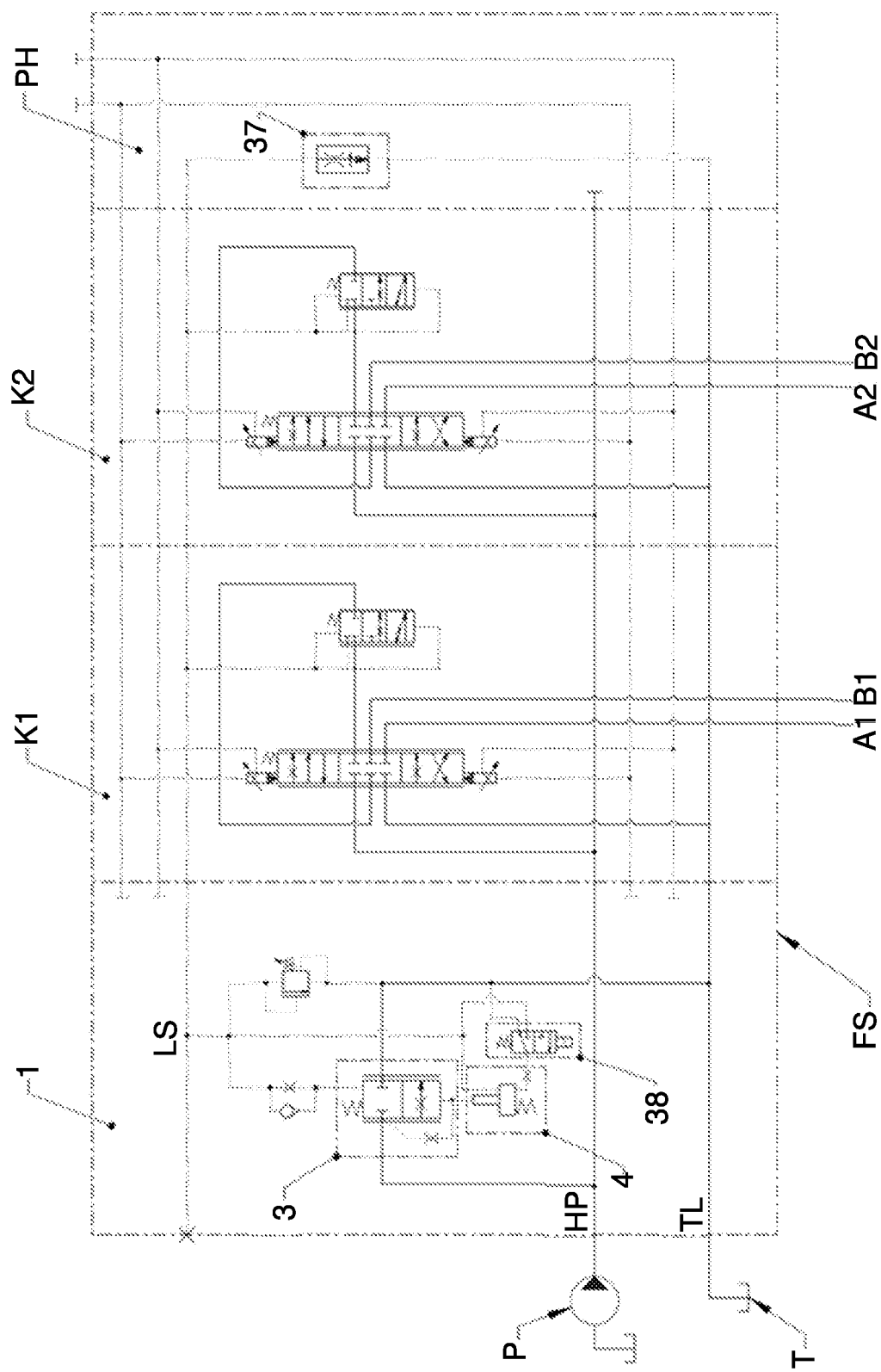
FIGS. 8-12 show different configurations of hydraulic diagrams of the hydraulic distributor comprising the inlet section in the embodiment of FIG. 3.
Figure 9:
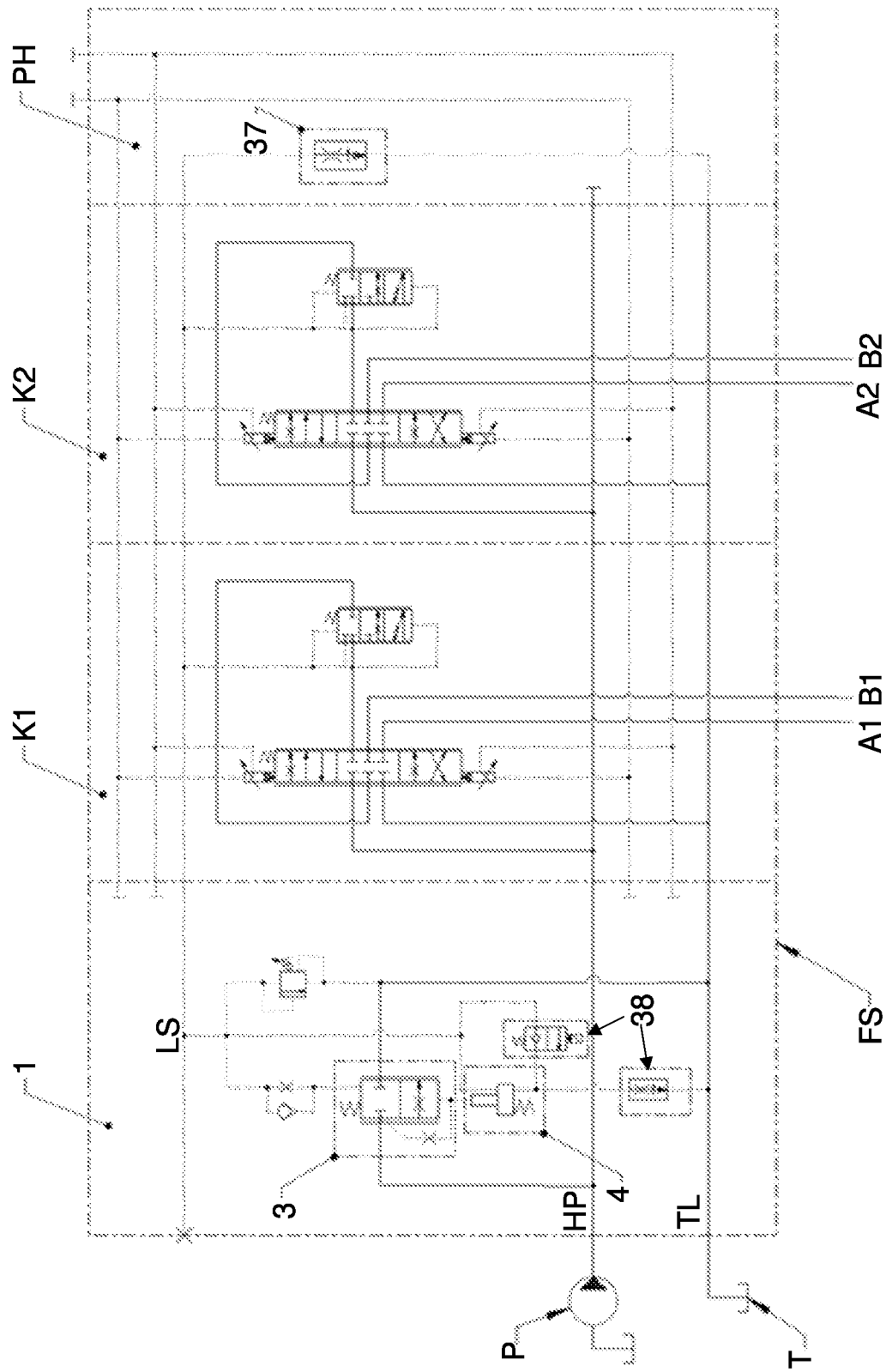

The configuration of FIGS. 8-9 provides a three-way, two-position device 38, acting on the pressure line coming from the spring chamber 34 of the control device 4, which selectively actuates the connection to discharge T or that to the second pressure LS of the spring chamber 34 itself. The device 38 is for example a solenoid valve.

Figure 10:
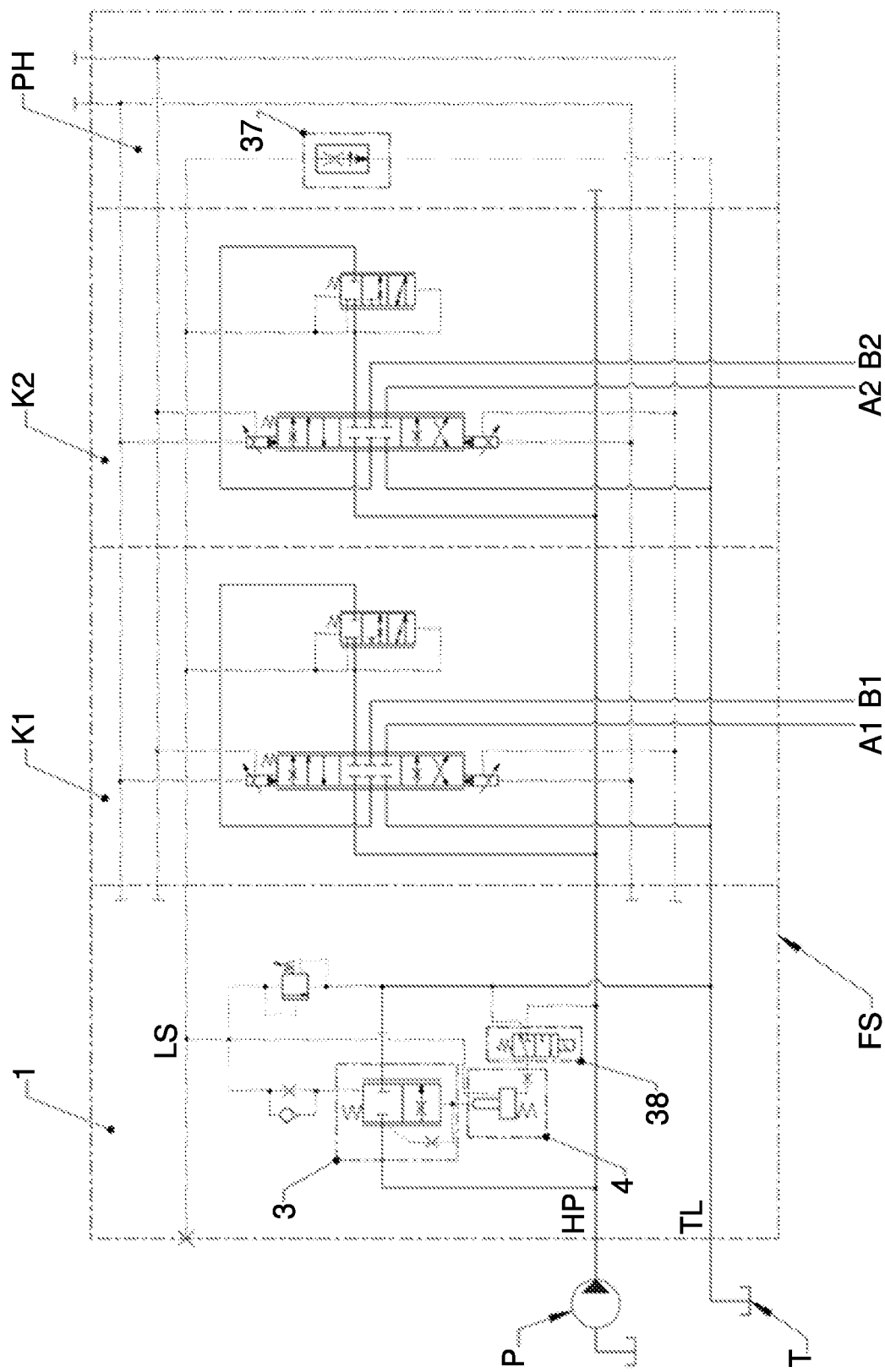
Figure 11:
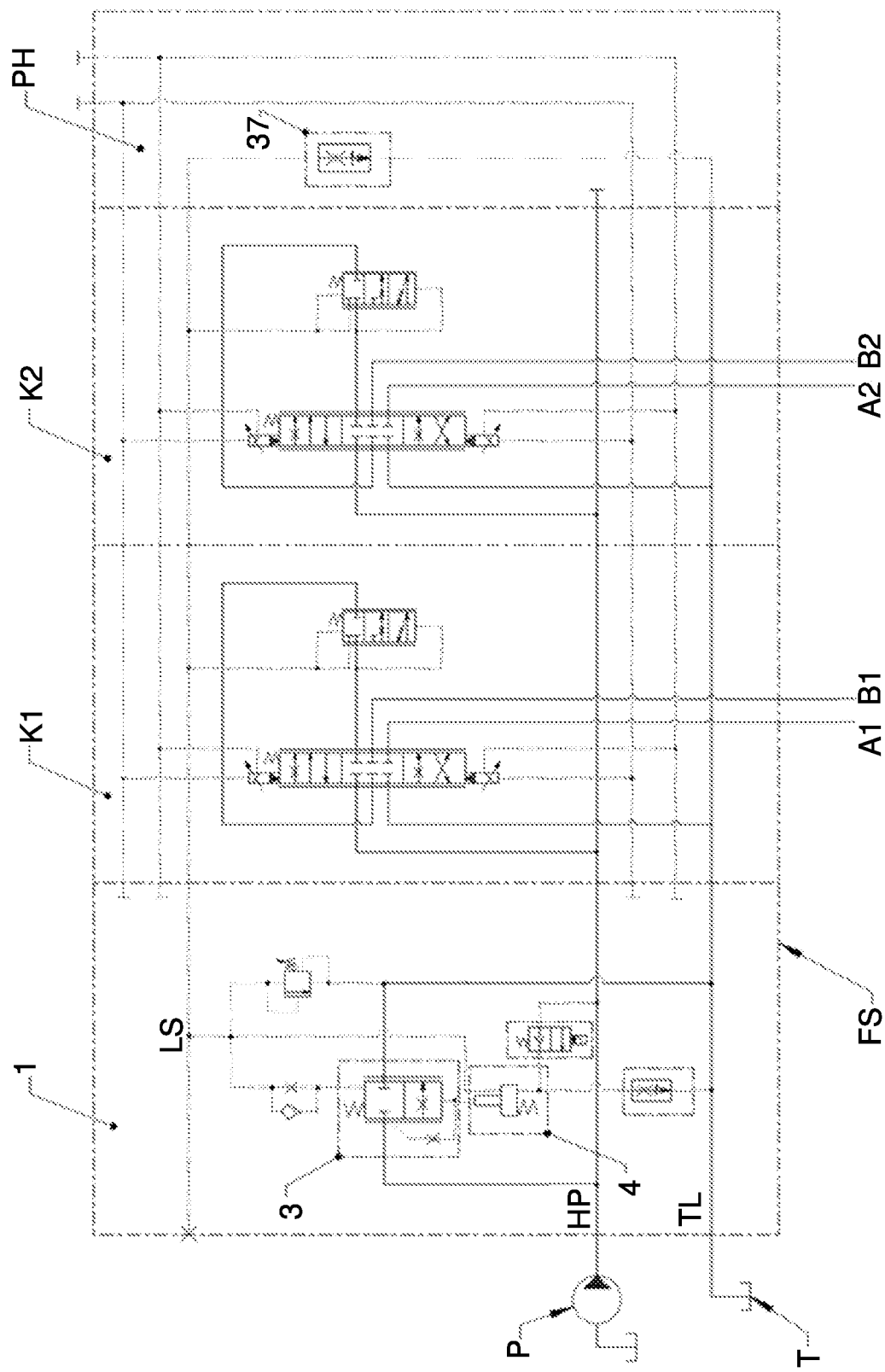
Figure 12:
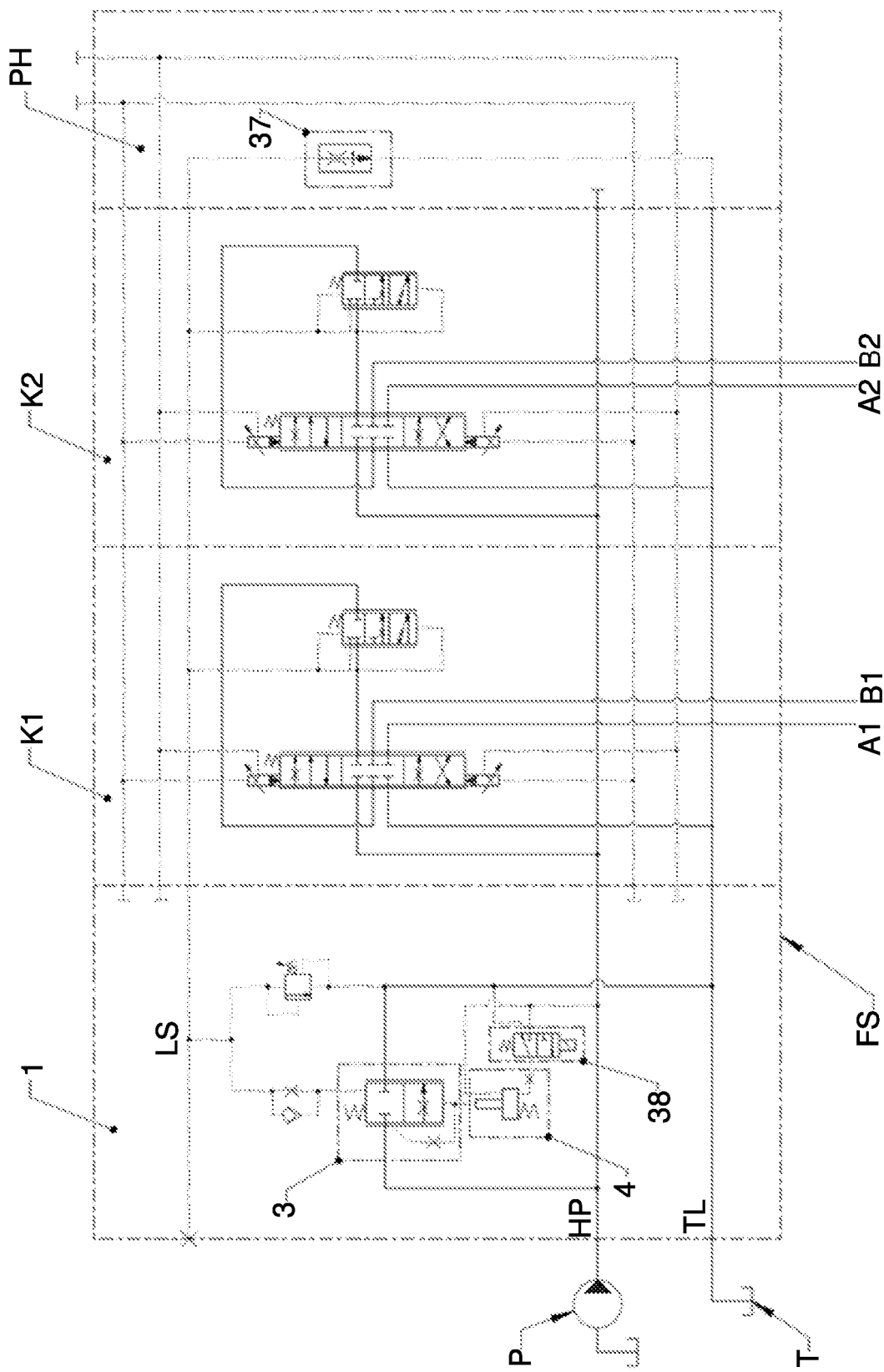

The three-way, two-position device 38 can be integrated with the distributor FS or be remote in the machine system and can be replaced by its variants as for example in FIGS. 10-12.

In the stand-by and standard operating configurations of the distributor FS, described above and shown for this embodiment respectively in FIGS. 8-11, the device 38 actuates the discharge connection of the spring chamber 34 of the control device 4.

When the device 38 actuates the signal connection LS with the spring chamber 34 of the control device 4, the spring chamber 34 is pressurized by the second pressure LS and the pressure margin reduction function is made operational even in standard working conditions, making the slow control configuration of the machine directly active, in which the excess flow not required by the users is discharged with a reduced pressure margin and consequent increase in energy savings.

In particular, the maximum antagonistic force at the compensator 3 is made operational even during normal system operation and not only in stand-by conditions. All this translates into a controlled reduction of the pressure margin of the system and consequently a reduction of the flow rates/implementation speeds with slight energy savings due to the lower operating pressure delta. The system operates in its "slow" configuration.

Figure 13:
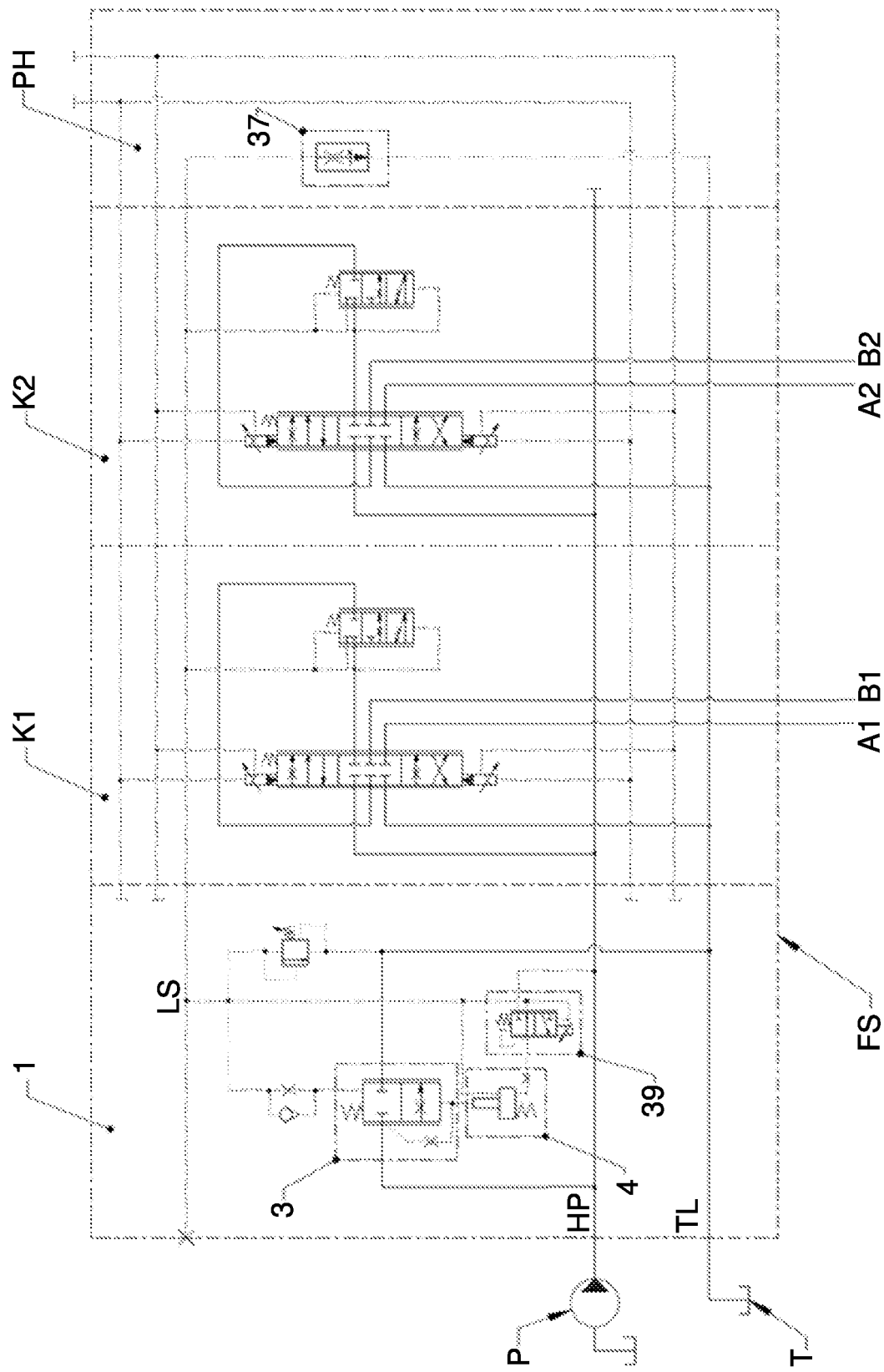
FIG. 13 shows a hydraulic diagram of the hydraulic distributor comprising the inlet section in the embodiment of figure.

FIG. 13 shows an embodiment capable of ensuring a continuous proportional control of the pressure margin.

In this embodiment, a proportional pressure reducer valve 39 is present along the pressure line of the spring chamber 34.

The pressure reducer 39 has a first inlet 39*a* communicating with the high pressure line HP, a second inlet 39*b* communicating with the detection line LS and an outlet 39*c* feeding the spring chamber 34.

The pressure reducer 39 is controlled to generate a regulated pressure in output which is modulated between a maximum value (first pressure value, fed by the high pressure line HP) and a minimum value (second pressure value, fed by the detection line LS). In the most extreme condition, in which the pressure required by the proportional control exceeds the actual value of the first pressure, no reduction occurs and the pressure fed to the spring chamber 34 is equal to the maximum pressure (i.e., the first pressure).

Such a pressure reducer 39 is structured to withstand high operating pressures.

The characteristics of the inlet section for use in a hydraulic distributor according to embodiments provided in the disclosure emerge clearly from the above description, as do the advantages.

In particular, the arrangement of compensator and control device aligned in a through hole allows to minimize the encumbrance and simplify the structure of the inlet section.

In fact, it is possible to implement the control device in the hole of the compensator already present in standard distributors. It is sufficient to insert the control device, with two closing caps at the two ends of the hole to make the two devices isolated from the outside.

Furthermore, the action of reducing the pressure drop during the pump flow discharge is entrusted to the control spring (in other words, it is mechanically obtained). This allows to reduce the operating instability as the LS pressure flow fluctuations are reduced, if not zeroed. The system is thus less sensitive to signal fluctuations, with respect to a version with differential areas, which entrusts the dynamic balance of the system to pressure differences.

Furthermore, the presence of a device which selectively actuates the connection of the discharge spring chamber T of the second pressure LS allows to obtain at least a double level of control (fast and slow) of the machine, depending on the operating conditions required in carrying out the work, also implementing a controlled reduction of the pressure margin in a slow configuration.

Furthermore, the proportional version of the pressure margin control allows to discriminate multiple system speed configurations, without being limited only to the discrete configurations "fast" and "slow". Being able to arrange a differential and proportional control device allows greater operating flexibility.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention

The invention claimed is:

1. An inlet section for use in a hydraulic distributor, comprising:
   a valve body;
   a slider, with a first area and a second area having the same size and being located at two opposite ends of said slider,
      said slider being longitudinally slidable within the valve body between a first position in which it prevents passage of fluid from a high pressure line to a low pressure line, and a second position in which it enables passage of fluid, and
      said first area being subjected to action of a first pressure fed by the high pressure line and acting in a direction to push the slider towards the second position, said second area being subjected to a second pressure fed by a line for detecting a highest load pressure required by uses placed downstream of the distributor, said second pressure acting in the opposite direction to said first pressure and to push the slider towards the first position;
   a main spring active on the second area of the slider in a direction consistent with action of the second pressure;
   a control device of the slider comprising a mechanical actuator member selectively active on the slider in a direction consistent with the action of the first pressure on the first area of the slider so as to force the slider in the second position,
      said mechanical actuator member comprising a third area and a fourth area being located at two opposite ends, said third area facing the first area of the slider and also subject to the first pressure, and
      said control device further comprising a control spring active on the fourth area opposed to the main spring;
   a spring chamber being defined inside said valve body, in which the fourth area of the mechanical actuator member and an end of the control spring are located; and
   a housing obtained in the valve body as a through hole having two open ends opposite each other, said inlet section comprising a first cap and a second cap closing said two open ends, said slider and said control device being arranged in the housing between said first cap and said second cap,
      said control device being configurable in a thrust condition, in which the third area acts on the first area of the slider together with the first pressure to force it into the second position thereof, and in a deactivating condition, in which the third area is distanced and retracted from the first area of the slider,
   wherein the mechanical actuator member comprises:
      an actuator element longitudinally sliding inside the housing and selectively active on the first area of the slider to force it into the second position thereof, said actuator element having a fifth and a sixth area having the same size and being located at two opposite ends of said actuator element, said fifth area of the actuator element is the same as the third area of the mechanical actuator member, said sixth area being subjected to the action of the second pressure; and
      a piston having a seventh area and an eighth area, the seventh area is in contact with the sixth area of the actuator element to move it towards the slider, said seventh area also being subject to the second pressure, and the eighth area is the same as the fourth area of the mechanical actuator member.

2. The inlet section according to claim 1, wherein the main spring is mounted so as to have a first abutment on the second area of the slider and a second abutment in a recess of the first cap.

3. The inlet section according to claim 1, wherein the control spring of the control device is mounted so as to have a first abutment on the fourth area of the mechanical actuator member and a second abutment in a recess of the second cap.

4. The inlet section according to claim 1, wherein the housing has a main extension along a longitudinal direction, said slider and said mechanical actuator member being arranged in the housing aligned along the longitudinal direction.

5. The inlet section according to claim 4, wherein the main spring, the slider, the mechanical actuator member and the control spring act along the longitudinal direction.

6. The inlet section according to claim 1, comprising an actuator body at least partially inserted into the housing and comprising:
   a first portion shaped so as to have a through hole in which the actuator element is slidably inserted, thus defining an intermediate chamber between the slider, internal walls of the valve body and the actuator body, in which said first area of the slider and said third area of the actuator element are located, said intermediate chamber being in fluid communication with the high pressure line; and
   a second portion being a jacket portion and originating from the first portion away therefrom, said second portion wrapping the piston, said piston being slidably mounted therein.

7. The inlet section according to claim 6, wherein the jacket portion has an open end in which it receives said second closing cap, thus defining said spring chamber between the mechanical actuator member, internal walls of the second portion of the jacket, and the second cap.

8. The inlet section according to claim 1, comprising a three-way two-position device, acting on the spring chamber to selectively actuate a connection with the low pressure line or with a detection line of the highest load pressure required by the uses.

9. The inlet section according to claim 1, comprising a pressure reducer valve having a first inlet in communication with the high pressure line, a second inlet in communication with a detection line and an outlet in communication downstream with the spring chamber so as to feed a regulated pressure having a value comprised between the one of the second pressure and the one of the first pressure.

* * * * *